(12) United States Patent
Wagoner et al.

(10) Patent No.: US 8,259,479 B2
(45) Date of Patent: Sep. 4, 2012

(54) METHODS AND SYSTEMS FOR OPERATING A TWO-STAGE POWER CONVERTER

(75) Inventors: Robert Gregory Wagoner, Roanoke, VA (US); David Smith, Daleville, VA (US); Allen Michael Ritter, Roanoke, VA (US); Mark E. Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/974,444

(22) Filed: Dec. 21, 2010

(65) Prior Publication Data

US 2012/0062044 A1  Mar. 15, 2012

(51) Int. Cl.
*H02M 7/537* (2006.01)
(52) U.S. Cl. .......................................... 363/97; 363/131
(58) Field of Classification Search ............... 363/35, 363/36, 95, 97, 98, 131, 132; 323/266
See application file for complete search history.

(56) References Cited

U.S. PATENT DOCUMENTS

| | | | |
|---|---|---|---|
| 4,533,986 A * | 8/1985 | Jones | 363/17 |
| 5,801,519 A | 9/1998 | Midya et al. | |
| 6,809,942 B2 * | 10/2004 | Madenokouji et al. | 363/98 |
| 7,855,906 B2 * | 12/2010 | Klodowski et al. | 363/97 |
| 8,085,564 B2 * | 12/2011 | Klodowski et al. | 363/97 |
| 2005/0110454 A1 | 5/2005 | Tsai et al. | |
| 2007/0103108 A1 | 5/2007 | Capp et al. | |

FOREIGN PATENT DOCUMENTS

| | | |
|---|---|---|
| EP | 2256579 A1 | 12/2010 |
| EP | 2395644 A2 | 12/2011 |
| KR | 20070078524 A | 8/2007 |

OTHER PUBLICATIONS

Barbosa et al., Novel Control Strategy for Grid-Connected DC-AC Converters with Load Power Factor and MPPT Control, Federal University of Rio de Janeiro, Department of Electrical Engineering, www.solar.coppe.ufrj. 13 pages.
Partial European Search Report dated Apr. 12, 2012 re Application No. 11193666.2-2210; 6 pages.

* cited by examiner

*Primary Examiner* — Gary L Laxton
(74) *Attorney, Agent, or Firm* — James McGinness, Esq.; Armstrong Teasdale LLP (57) ABSTRACT

A power conversion system for providing power to an electrical grid is described. The system includes a boost converter coupled to a photovoltaic (PV) array and configured to control a PV array voltage. The system also includes an inverter coupled to the boost converter by at least one conductor and configured to regulate a voltage drop across the at least one conductor. The system also includes a system controller configured to control operation of the boost converter and the inverter.

17 Claims, 7 Drawing Sheets

METHODS AND SYSTEMS FOR OPERATING A TWO-STAGE POWER CONVERTER

BACKGROUND OF THE INVENTION

The embodiments described herein relate generally to solar power generation, and more specifically, to methods and systems for operating a two-stage power converter.

Solar energy has increasingly become an attractive source of energy and has been recognized as a clean, renewable alternative form of energy. Solar energy in the form of sunlight may be converted to electrical energy by solar cells. A more general term for devices that convert light to electrical energy is "photovoltaic cells." Sunlight is a subset of light. Thus, solar cells are a subset of photovoltaic (PV) cells. A PV cell comprises a pair of electrodes and a light-absorbing PV material disposed therebetween. When the PV material is irradiated with light, electrons that have been confined to an atom in the PV material are released by light energy to move freely. Thus, free electrons and holes are generated. The free electrons and holes are efficiently separated so that electric energy is continuously extracted. Current commercial PV cells use a semiconductor PV material, typically silicon.

In order to obtain a higher current and voltage, solar cells are electrically connected to form a solar module. In addition to a plurality of solar cells, the solar module may also include sensors, for example, an irradiance sensor, a temperature sensor, a voltage meter, a current meter, and/or a power meter. Solar modules may also be connected to form a module string. Typically, the DC voltages output by the module strings are provided to a grid inverter, for example, a DC to AC voltage inverter. The DC to AC voltage inverter converts the DC voltage to three-phase alternating current (AC) voltage or current. The three-phase AC output from the DC to AC inverter is provided to a power transformer, which steps up the voltage to produce a three-phase high-voltage AC that is applied to an electrical grid.

Electricity applied to the electrical grid is required to meet grid connectivity expectations. These expectations address safety issues as well as power quality concerns. For example, the grid connectivity expectations include operating the power generation system during a transient event, for example, a power surge or power failure along the electrical grid. This capability may be referred to as low voltage ride through (LVRT) or zero voltage ride through (ZVRT). An LVRT/ZVRT event is a condition where the alternating current (AC) utility voltage is low on either one phase of the electrical grid or multiple phases of the electrical grid. During an LVRT/ZVRT event, the capacity of the electrical grid to accept power from the power generation system is low. Another grid connectivity expectation is that the generated power be conditioned to ensure that the power matches the voltage and frequency of the electricity flowing through the electrical grid.

BRIEF DESCRIPTION OF THE INVENTION

In one aspect, a power conversion system for providing power to an electrical grid is provided. The system includes a boost converter coupled to a photovoltaic (PV) array and configured to control a PV array voltage. The system also includes an inverter coupled to the boost converter by at least one conductor and configured to regulate a voltage drop across the at least one conductor. The system also includes a system controller configured to control operation of the boost converter and the inverter.

In another aspect, a method for controlling operation of a two-stage power converter in response to at least one of a low voltage ride through (LVRT) grid event and a zero voltage ride through (ZVRT) grid event is provided. The two-stage power converter includes a boost converter and an inverter coupled by at least one conductor. The method includes receiving a voltage sensor signal and a current sensor signal. The method also includes providing a boost converter operating signal to the boost converter. The boost converter is configured to control a photovoltaic (PV) array voltage based on the boost converter operating signal. The method also includes providing an inverter operating signal to the inverter. The inverter is configured to control a voltage across the at least one conductor based on the inverter operating signal.

In yet another aspect, a system controller coupled to, and configured to control operation of, a two-stage power converter in response to at least one of a low voltage ride through (LVRT) event and a zero voltage ride through (ZVRT) event is provided. The system controller is configured to receive a voltage sensor signal and a current sensor signal, determine a reduced power operating point based on the voltage sensor signal and the current sensor signal, and provide a DC bus voltage control signal to a first stage of the two-stage power converter. The system controller is also configured to provide a photovoltaic (PV) array voltage control signal to a second stage of the two-stage power converter, the DC bus voltage control signal corresponding to the reduced power operating point.

DETAILED DESCRIPTION OF THE INVENTION

The methods and systems described herein facilitate controlling a two-stage power converter during a ride through grid event, for example, a low voltage ride through (LVRT) grid event and/or a zero voltage ride through (ZVRT) grid event. More specifically, the methods and systems described herein separately control a boost converter and an inverter included within the two-stage power converter. For example, the methods and systems described facilitate reducing an output of the two-stage power converter during a ride through grid event by either increasing a photovoltaic (PV) array direct current (DC) voltage or decreasing the PV array DC voltage.

Technical effects of the methods and systems described herein include at least one of: (a) receiving a voltage sensor signal and a current sensor signal; (b) controlling a boost converter to control a photovoltaic (PV) array DC voltage; and (c) controlling the inverter to control voltage across a DC bus.

Figure 1:
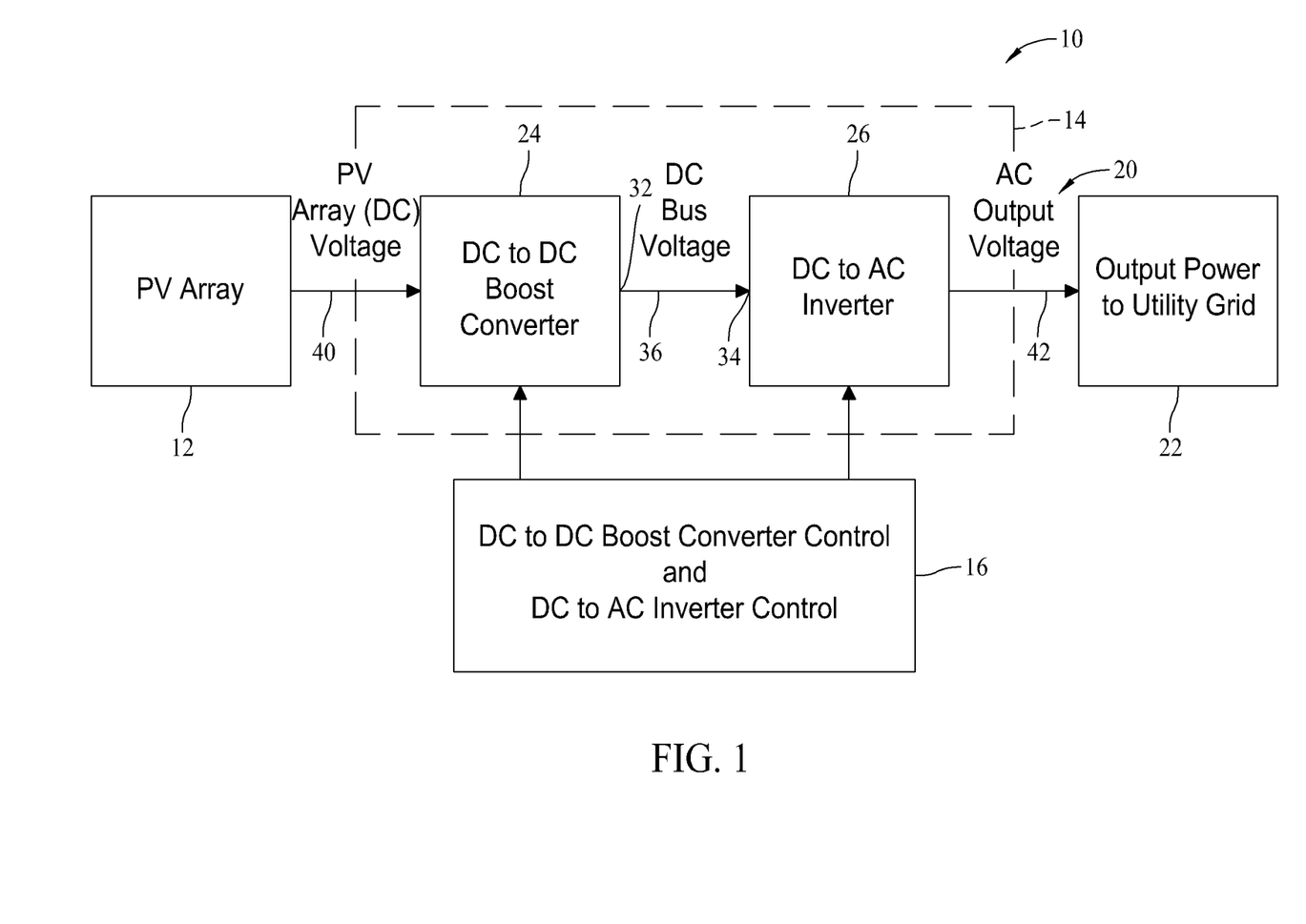
FIG. 1 is a block diagram of an exemplary embodiment of a photovoltaic (PV) power generation system.

FIG. 1 is a block diagram of an exemplary embodiment of a photovoltaic (PV) power generation system 10. In the exemplary embodiment, PV power generation system 10 includes a PV array 12, a two-stage power converter 14, and a system controller 16. System 10 is configured to provide an alternating current (AC) output voltage 20 for delivery to a load, for example, but not limited to, a transformer or an electrical grid 22. Electrical grid 22 may include an electrical distribution grid, an electrical transmission grid, or any type of electrical grid configured for delivering electricity. PV array 12 includes at least one PV cell (not shown in FIG. 1), for example, at least one solar cell. Typically, a plurality of solar cells are coupled to form a solar array, also referred to as a solar module, and multiple solar modules are coupled to form a module string. The solar cells are arranged in this manner to increase the voltage and current output by the solar array. Although described herein as receiving power generated by PV array 12, two-stage power converter 14 may be provided with power from any suitable DC source that allows system 10 to function as described herein.

It should be noted that the embodiments described herein are not limited to any particular system controller and/or processor for performing the processing tasks described herein. The term "processor," as that term is used herein, is intended to denote any machine capable of performing the calculations, or computations, necessary to perform the tasks described herein. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, two-stage power converter 14 includes a DC to DC boost converter 24 and a DC to AC inverter 26. System controller 16 is configured to independently control operation of boost converter 24 and inverter 26. System controller 16 is configured to determine a power operating point that is provided to two-stage power converter 14 for controlling operation of two-stage power converter 14. For example, a maximum power point may be determined by system controller 16 using a process referred to as maximum power point tracking (MPPT). System controller 16 provides a power operating point signal corresponding to the maximum power point to boost converter 24, and in response, boost converter 24 is configured to extract a maximum power available from PV array 12.

More specifically, a load resistance can be determined based on the voltage and current values determined to result in a maximum power output. For example, the voltage and current values correspond to a particular load resistance, which is equal to voltage divided by current. As such, system controller 16 controls the load resistance that boost converter 24 presents to PV array 12, and therefore, controls a PV array DC voltage. Controlling the load resistance facilitates controlling power output by boost converter 24. MPPT presents an optimal load resistance to PV array 12 such that power output by boost converter 24 is maximized. The optimal load resistance matches an impedance of PV array 12 allowing boost converter 24 to extract and output the maximum power available from PV array 12. The power operating point may also be adjusted to curtail PV array 12 (i.e., output less real power than is available). PV array 12 may be curtailed in order to reduce the power provided to electrical grid 22 in response to, for example, reduced energy demand or a grid event.

An output 32 of boost converter 24 is coupled to an input 34 of inverter 26 by at least one conductor, for example, a DC bus 36. PV array 12 is coupled to two-stage power converter 14 through at least one conductor 40, and inverter 26 is coupled to electrical grid 22 through at least one conductor 42. Although illustrated as single lines, conductor 40, conductor 42, and DC bus 36 may include any number of separate conductors that allows system 10 to function as described herein. For example, if PV power generation system 10 is a single phase system, conductor 40, conductor 42, and DC bus 36 may each include a single conductor. Alternatively, if PV power generation system 10 is a three phase system, conductor 40, conductor 42, and DC bus 36 may each include three separate conductors, one for each phase. Furthermore, PV power generation system 10 may include any suitable number of phases. A DC bus voltage is controlled by inverter 26. More specifically, system controller 16 controls operation of inverter 26 to control the DC bus voltage. Furthermore, inverter 26 may be configured to control a power factor of AC voltage 20 output by inverter 26 and provided to electrical grid 22.

Figure 2:
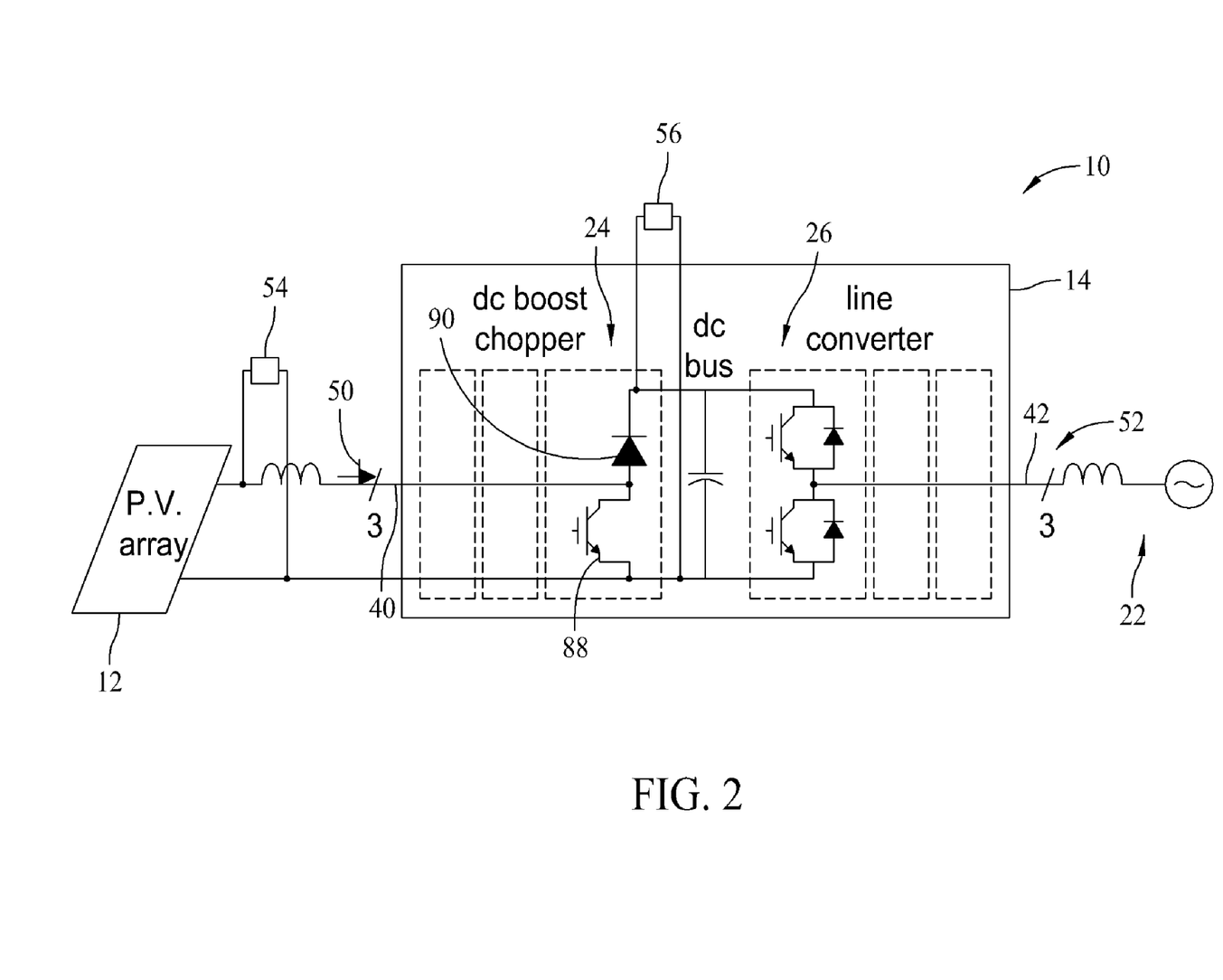
FIG. 2 is a circuit diagram of the PV power generation system shown in FIG. 1.

FIG. 2 is a circuit diagram of PV power generation system 10 (shown in FIG. 1). Components shared between FIGS. 1 and 2 are identified with identical reference numerals. In the exemplary embodiment, system 10 includes a plurality of current measurement devices 50 configured to measure a current flowing through conductor 40 (i.e., current input to power converter 14) and a plurality of current measurement devices 52 configured to measure a current flowing through conductor 42 (i.e., current output by power converter 14). System 10 also includes a PV voltage measurement device 54 configured to measure the PV array voltage level. Current measurement device 50 provides system controller 16 (shown in FIG. 1) with a PV array current signal corresponding to the measured PV array current. Voltage measurement device 54 provides system controller 16 with a PV array voltage signal corresponding to the measured PV array voltage level. System 10 also includes a DC bus voltage measurement device 56. DC bus voltage measurement device 56 provides system controller 16 with a DC bus voltage signal corresponding to the measured DC bus voltage.

Figure 3:
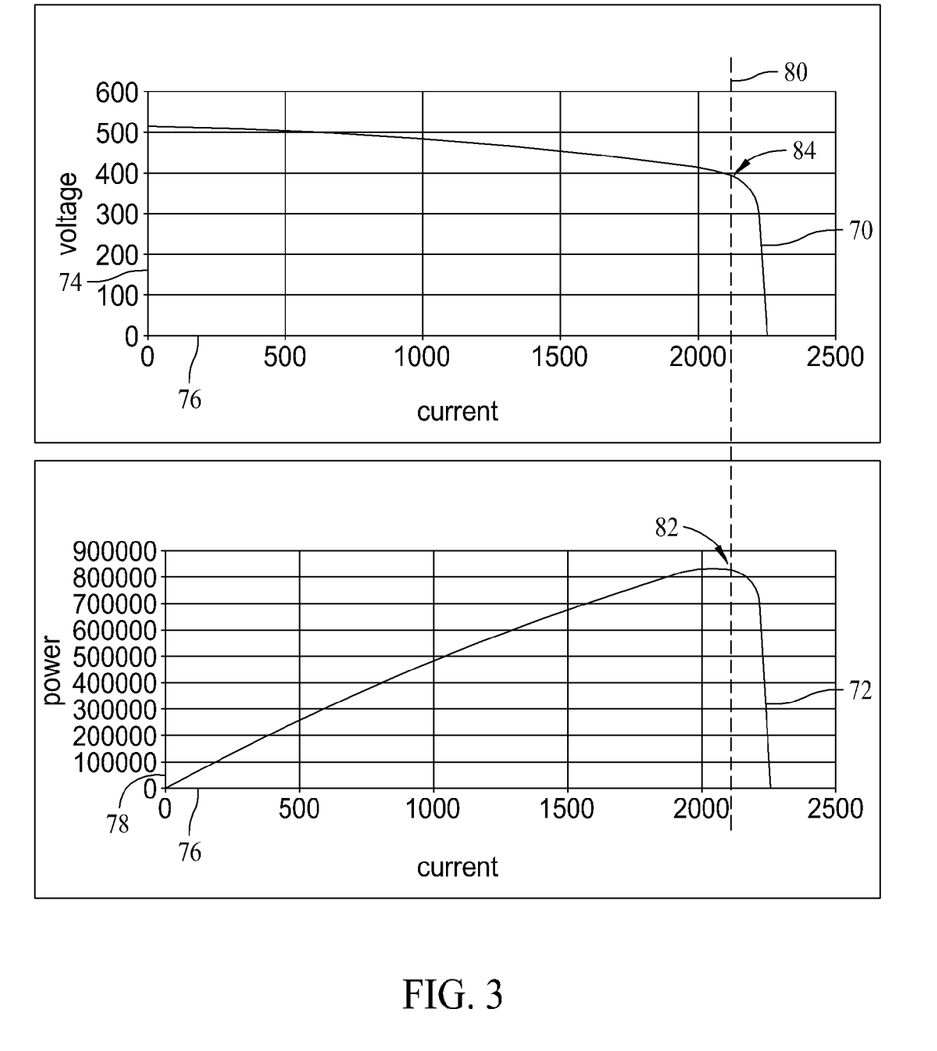
FIG. 3 is a plot of a typical PV array V-I curve and a typical PV array power curve at a particular temperature and irradiance.

FIG. 3 is a plot of a typical PV array V-I curve 70 and a typical PV array power curve 72 at a particular temperature and irradiance. V-I curve 70 compares a PV array DC voltage 74 to a PV array DC current 76. Power curve 72 compares power output 78 by boost converter 24 to PV array DC current 76. A maximum power operating point 80 is determined by identifying a maximum power on power curve 72, identified generally at point 82, and the corresponding voltage and current values from V-I curve 70, identified generally at point 84. Two-stage converter 14 is configured to operate at maximum power operating point 80 in order to produce as much power as PV array 12 is able to produce for given conditions (i.e., given temperature and irradiance values). However, at times it is not desirable to operate two-stage converter 14 at maximum power operating point 80. For example, during an LVRT event, since there is low voltage on electrical grid 22, electrical grid 22 does not have capacity to accept power from power generation system 10. Therefore, during an LVRT event, two-stage power converter 14 is configured to temporarily reduce AC power output 20 until the voltage on electrical grid 22 increases.

Figure 4:
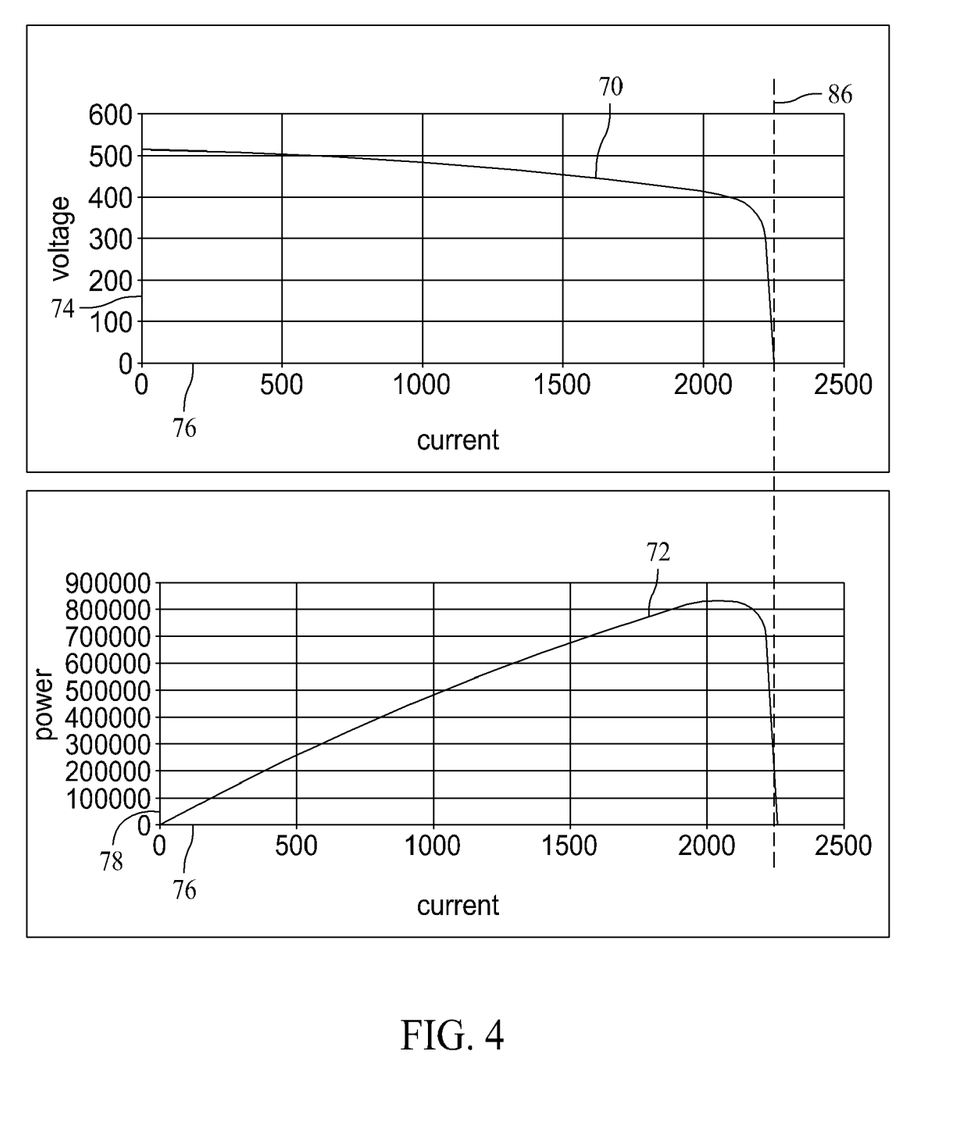
FIG. 4 is a plot of the PV array V-I curve and the PV array power curve shown in FIG. 3, and a first reduced power operating point.

FIG. 4 is a plot of PV array V-I curve 70, PV array power curve 72, and a first reduced power operating point 86. In the exemplary embodiment, during a ride through grid event, boost converter 24 operates at first reduced power operating point 86, which is a point on PV array V-I curve 70 on a high current side of maximum power point 80 (shown in FIG. 3). Operating at first reduced power operating point 86 reduces the PV array voltage and regulates the PV array voltage at a level that allows enough power to flow into two-stage converter 14 to supply necessary output power and losses. For example, a sum of the power output 78 by power converter 14 and power losses in power converter 14 must be supplied by PV array 12. At first reduced power operating point 86, PV array voltage is regulated at a level below a typical voltage, for example, below a voltage associated with maximum power point 80. Decreasing the PV array voltage causes the PV array current to increase. Operating at a higher PV array current level is facilitated by diverting the PV array current into at least one of an insulated gate bipolar transistor (IGBT) 88 (shown in FIG. 2) and a diode 90 (shown in FIG. 2) of boost converter 24, which allows boost converter 24 to be operated at the lower PV array voltage.

Figure 5:
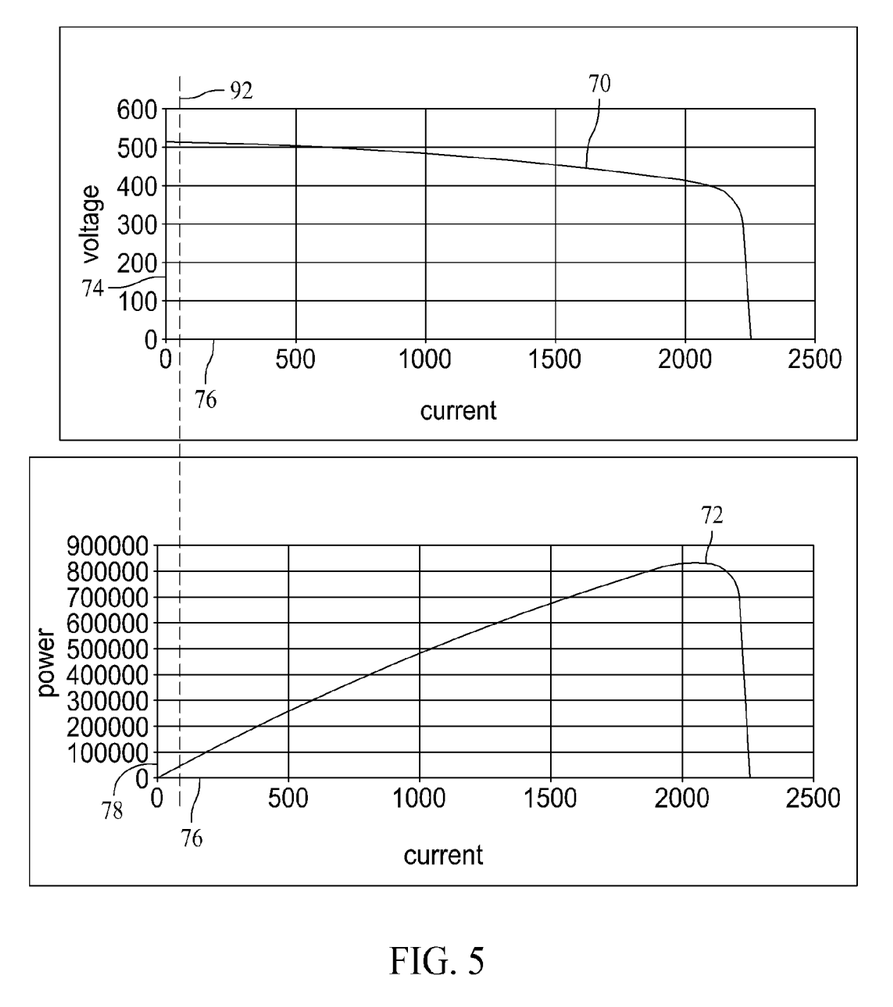
FIG. 5 is a plot of the PV array V-I curve and the PV array power curve shown in FIG. 3, and a second reduced power operating point.

FIG. 5 is a plot of PV array V-I curve 70, PV array power curve 72, and a second reduced power operating point 92. In an alternative embodiment, during a ride through grid event, boost converter 24 operates at second reduced power operating point 92, which is a point on PV array V-I curve 70 on a low current side of maximum power point 80 (shown in FIG. 3). Operating at second reduced power operating point 92 increases the PV array voltage and regulates the PV array voltage at a level that allows enough power to flow into two-stage power converter 14 to supply necessary output power and losses. At second reduced power operating point 92, PV array voltage is regulated at a level above a typical voltage, for example, above a voltage associated with maximum power point 80. Operating at a higher PV array voltage, and an accompanying lower PV array current, facilitates reducing AC power output 20.

Figure 6:
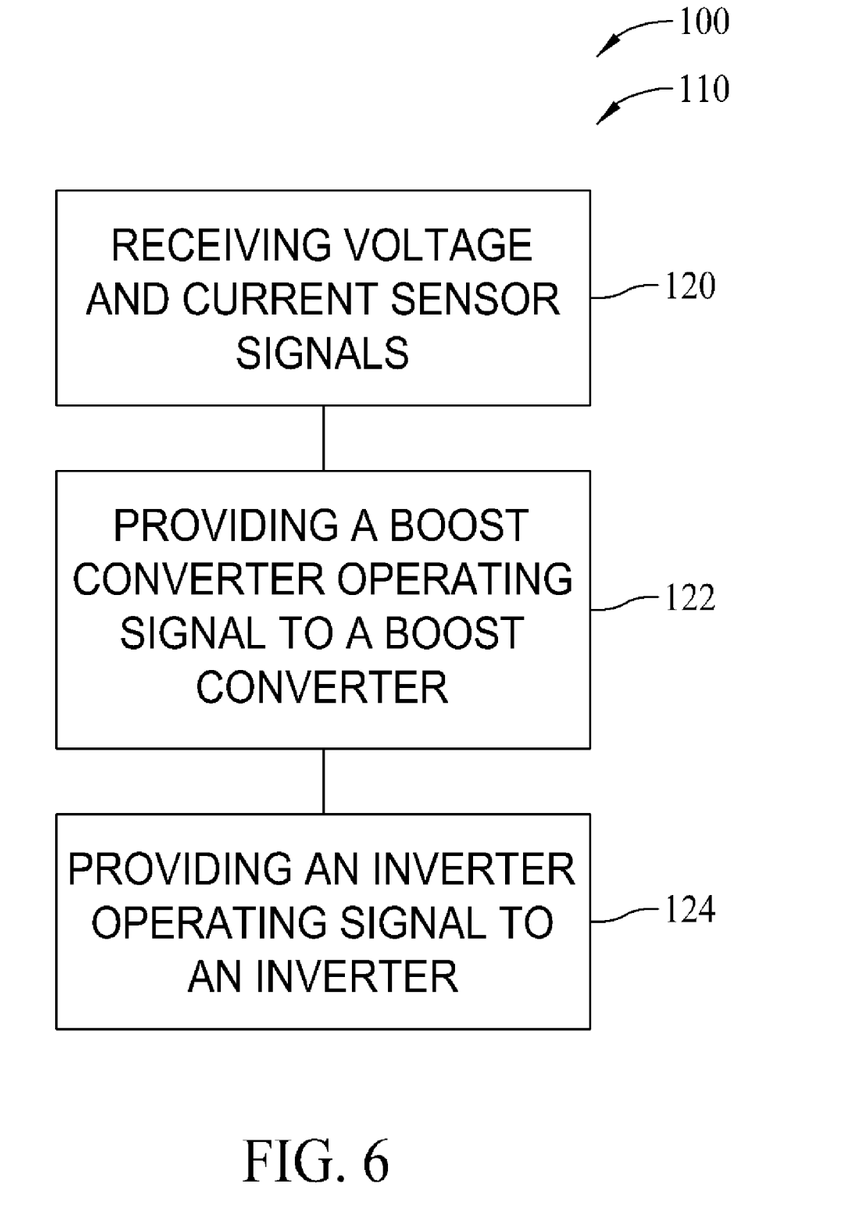
FIG. 6 is a flow chart of an exemplary method for controlling operation of the two-stage power converter shown in FIG. 1, in response to a grid voltage event.

FIG. 6 is a flow chart 100 of an exemplary method 110 for controlling operation of a two-stage power converter, for example, two-stage power converter 14 (shown in FIG. 1), in response to a grid voltage event (e.g., LVRT event or ZVRT event). In the exemplary embodiment, method 110 includes receiving 120 voltage and current sensor signals. For example, system controller 16 receives 120 a PV array voltage signal and a PV array current signal from measurement devices 50 and 52 (shown in FIG. 2). System controller 16 also receives 120 a DC bus voltage signal and a DC bus current signal from, for example, measurement devices 54 and 56.

In the exemplary embodiment, method 110 also includes providing 122 a boost converter operating signal to a boost converter, for example, boost converter 24 (shown in FIG. 1) to control the photovoltaic (PV) array DC voltage. Method 110 also includes providing 124 an inverter operating signal to an inverter, for example, DC to AC inverter 26 (shown in FIG. 1) to control the DC bus voltage.

The boost converter operating signal provided 122 by system controller 16 controls boost converter 24 in order to minimize output power during at least one of an LVRT event and a ZVRT event. For example, system controller 16 may provide boost converter 24 with a reduced power operating point signal. As described above, the reduced power operating point signal may cause boost converter 24 to reduce the PV array DC voltage to minimize output power, or may cause boost converter 24 to increase the PV array DC voltage to minimize output power.

The boost converter operating signal provided 122 by system controller 16 may also control boost converter 24 to apply a reduced power operating point in response to a measured DC bus voltage that meets or exceeds a predefined voltage threshold. In the exemplary embodiment, the predefined voltage threshold is stored and accessed by system controller 16. A DC bus voltage above the predefined voltage threshold may damage two-stage power converter 14.

Furthermore, system controller 16 may also control boost converter 24 to apply a reduced power operating point in response to a measured PV array DC current (i.e., the DC current provided by PV array 12) that meets or exceeds a predefined current threshold. As described above with respect to the predefined voltage threshold, a PV array DC current above the predefined current threshold may damage two-stage power converter 14.

Figure 7:
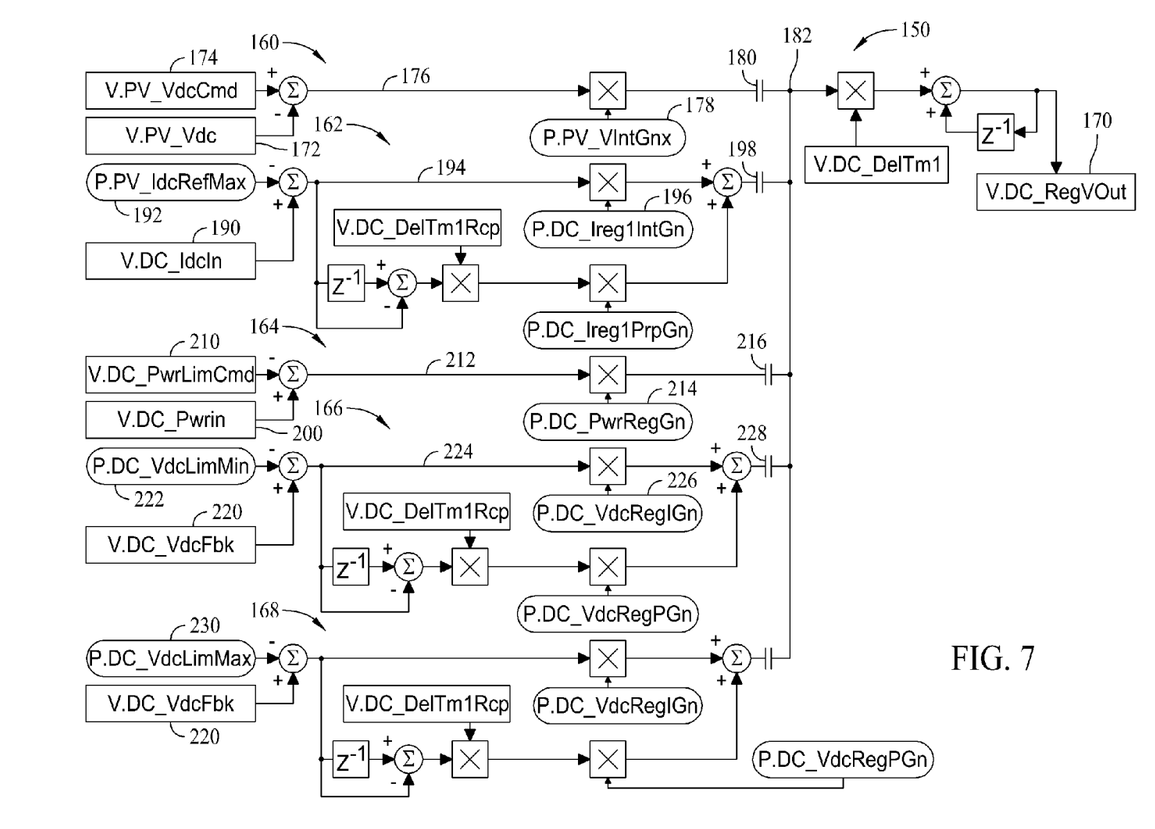
FIG. 7 is an exemplary control diagram applied by the system controller shown in FIG. 1.

FIG. 7 is an exemplary control diagram 150 applied by a system controller, for example, system controller 16 (shown in FIG. 1), to control operation of two-stage power converter 14 (shown in FIG. 1). Control diagram 150 includes five control paths, first path 160, second path 162, third path 164, fourth path 166, and fifth path 168. A PV array voltage level 170 is determined using control diagram 150. More specifically, an operating signal (e.g., a voltage command) corresponding to PV array voltage level 170 is provided to a boost converter, for example, boost converter 24 (shown in FIG. 1). Boost converter 24 is configured to apply the operating signal, for example, to adjust a load resistance applied to PV array 12 (shown in FIG. 1). In embodiments including multiple phases, current balance regulator outputs are added to the operating signal, and then each is divided by the DC bus voltage to obtain a modulation command for each phase.

In the exemplary embodiment, first path 160 is utilized during normal operation of two-stage power converter 14. A PV array voltage 172 is summed with and compared to a PV voltage command 174, resulting in a PV voltage error signal 176. PV voltage command 174 is determined by system controller 16 based at least partially on the power operating point. PV voltage error signal 176 is multiplied by a gain 178 and fed through a selection switch 180 into a node 182 that feeds a system controller output (not shown in FIG. 7).

In the exemplary embodiment, second path 162 is configured to take control when a PV array current 190 exceeds a predefined PV array current threshold 192. PV array current 190 is summed with and compared to the predefined PV array current threshold 192 (e.g., a PV maximum current reference), resulting in a PV over-current error signal 194. PV over-current error signal 194 is multiplied by a gain 196 and fed through a selection switch 198 into node 182.

In the exemplary embodiment, third path 164 is configured to take control if an actual PV array power 200 exceeds a predefined threshold 210 (e.g., a PV array maximum power reference), which occurs, for example, during a LVRT or ZVRT event. PV array power 200 is summed with and compared to PV array maximum power reference 210, resulting in a PV over-power error signal 212. Error signal 212 is multiplied by a gain 214 and fed through a selection switch 216 into node 182. PV array maximum power reference 210 can change, either as a result of reduced power demand from a higher level control or as a result of a LVRT or ZVRT event.

In the exemplary embodiment, fourth path 166 is configured to take control if a DC bus voltage 220 drops during an LVRT or ZVRT event. DC bus voltage level 220 is summed with and compared to a DC bus minimum voltage reference 222, resulting in an under-voltage error signal 224. Under-voltage error signal 224 is multiplied by a gain 226 and fed through a selection switch 228 into node 182. As described above, DC to AC inverter 26 and boost converter 24 are independently controlled, and DC to AC inverter 26 controls DC bus voltage 220. However, if DC bus voltage 220 is reduced below DC bus minimum voltage reference 222, the DC bus current may increase to a level that may damage two-stage power converter 14. In this situation, system controller 16 controls boost converter 24 to increase DC bus voltage 220. Fourth path 166 facilitates bypassing third path 164, which allows boost converter 24 to supply converter and inverter losses during a LVRT or ZVRT event of extended duration and/or after a phase jump on electrical grid 22.

In the exemplary embodiment, fifth path 168 is configured to take control if DC bus voltage 220 exceeds a DC bus maximum voltage reference 230. If DC bus voltage 220 exceeds the DC bus maximum voltage reference 230, which is a voltage level that may cause damage to two-stage power converter 14, a signal from fifth path 168 is provided to node 182.

Furthermore, one or more computer-readable media having computer-executable components, may be configured for controlling operation of a two-stage power converter. The computer-executable components may include: an interface component that, when executed by at least one processor, causes the at least one processor to receive a voltage measurement signal and a current measurement signal; a memory component that, when executed by at least one processor, causes the at least one processor to store at least one algorithm for determining PV array voltage commands corresponding to reduced power operating points; and an analysis component that, when executed by at least one processor, causes the at least one processor to generate operating signals that control operation of the two-stage power converter.

The embodiments described herein embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The above-described embodiments facilitate efficient and cost-effective operation of a two-stage power converter. The control system described herein controls operation of the two-stage power converter to facilitate LVRT and ZVRT.

Exemplary embodiments of a power generation system that includes a two-stage power converter are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system for providing power to an electrical grid comprising:
    a boost converter coupled to a photovoltaic (PV) array and configured to control a PV array voltage;
    an inverter coupled to the boost converter by at least one conductor and configured to regulate a voltage drop across the at least one conductor; and,
    a system controller configured to:
        control operation of the boost converter and the inverter during normal operation and in response to at least one of a low voltage ride through (LVRT) grid event and a zero voltage ride through (ZVRT) grid event; and,
        determine a reduced power operating point in response to the at least one of the LVRT grid event and the ZVRT grid event.

2. A system in accordance with claim 1, wherein the system controller is configured to provide a reduced power operating point signal corresponding to the reduced power operating point to the boost converter, which in response to the reduced power operating point signal is configured to adjust the PV array voltage.

3. A system in accordance with claim 2, wherein the boost converter is configured to increase the PV array voltage in response to the reduced power operating point signal, causing a decrease in PV array current, and a reduction in power provided to the at least one conductor.

4. A system in accordance with claim 2, wherein the boost converter is configured to reduce the PV array voltage in response to the reduced power operating point signal, causing an increase in PV array current, and a reduction in power provided to the at least one conductor.

5. A system in accordance with claim 4, wherein the boost converter comprises at least one of an insulated gate bipolar transistor (IGBT) and a diode, the PV array current diverted into at least one of the IGBT and the diode, which allows the boost converter to operate at the lower PV array voltage.

6. A system in accordance with claim 1, wherein the system controller is further configured to provide the reduced power operating point signal to the boost converter in response to at least one of a current within the at least one conductor that exceeds a predefined maximum current threshold and a voltage drop across the at least one conductor that exceeds a predefined maximum voltage threshold.

7. A system in accordance with claim 6, wherein the boost converter is configured to reduce the PV array voltage to protect the inverter from current levels above the predefined maximum current threshold.

8. A method for controlling operation of a two-stage power converter in response to at least one of a low voltage ride through (LVRT) event and a zero voltage ride through (ZVRT) event, wherein the two-stage power converter includes a boost converter and an inverter coupled by at least one conductor, said method comprising:
receiving a voltage sensor signal and a current sensor signal;
determining a reduced power operating point based on the voltage sensor signal and the current sensor signal;
providing a boost converter operating signal to the boost converter, the boost converter configured to control a photovoltaic (PV) array voltage based on a reduced power operating point signal corresponding to the reduced power operating point; and,
providing an inverter operating signal to the inverter, the inverter configured to control a voltage across the at least one conductor based on the inverter operating signal.

9. A method in accordance with claim 8, wherein receiving a voltage sensor signal and a current sensor signal comprises receiving at least one of a PV array DC voltage signal, a PV array current signal, and a DC bus voltage signal.

10. A method in accordance with claim 8, wherein providing the boost converter operating signal to the boost converter further comprises controlling the boost converter to minimize an output power during at least one of an LVRT event and a ZVRT event.

11. A method in accordance with claim 8, further comprising providing the reduced power operating point signal in response to at least one of a measured DC bus voltage that meets or exceeds a predefined voltage threshold and a measured PV array DC current that meets or exceeds a predefined current threshold.

12. A method in accordance with claim 8, further comprising configuring the boost converter to increase the PV array voltage to minimize the output power.

13. A method in accordance with claim 8, further comprising configuring the boost converter to reduce the PV array voltage to minimize the output power.

14. A method in accordance with claim 13, further comprising configuring the boost converter to divert the PV array current into at least one of an insulated gate bipolar transistor (IGBT) included within the boost converter and a diode included within the boost converter, which allows the boost converter to operate at the lower PV array voltage.

15. A system controller coupled to, and configured to control operation of, a two-stage power converter in response to at least one of a low voltage ride through (LVRT) event and a zero voltage ride through (ZVRT) event, said system controller configured to:
receive a voltage sensor signal and a current sensor signal;
determine a reduced power operating point based on the voltage sensor signal and the current sensor signal;
provide a DC bus voltage control signal to a first stage of the two-stage power converter; and,
provide a photovoltaic (PV) array voltage control signal to a second stage of the two-stage power converter, the DC bus voltage control signal corresponding to the reduced power operating point.

16. A system controller in accordance with claim 15, wherein the first stage of the two-stage power converter comprises a DC to AC inverter and the second stage of the two-stage power converter comprises a DC to DC boost converter.

17. A system controller in accordance with claim 15, wherein the PV array voltage control signal at least one of increases and decreases the PV array voltage in order to reduce a power output by the two-stage power converter.

* * * * *